Aug. 21, 1951 F. WILKINSON 2,565,160

CURSOR MOUNTING FOR RADIO RECEIVERS

Filed Jan. 15, 1948

INVENTOR
FRANK WILKINSON
BY [signature]
ATTORNEY

Patented Aug. 21, 1951 2,565,160

UNITED STATES PATENT OFFICE 2,565,160

CURSOR MOUNTING FOR RADIO RECEIVERS

Frank Wilkinson, Southall, England, assignor to Electric & Musical Industries Limited, Hayes, Middlesex, England, a company of Great Britain Application January 15, 1948, Serial No. 2,504
In Great Britain June 6, 1946

Section 1, Public Law 690, August 8, 1946
Patent expires June 6, 1966

11 Claims. (Cl. 116—124.1)

This invention relates to indicating devices such as are used in radio receivers, in which a cursor carries a pointer which serves to indicate on an indicator panel the transmitting station to which the receiver is tuned.

The object of the present invention is to provide an improved indicating device, with a view to obtaining a cursor which is easy to manipulate and yet is steadily seated.

According to the invention there is provided a cursor mounted for substantially rectilinear movement on a guide bar of substantial L-shape in cross-section, the cursor being of a substantial U-shape in cross-section and embracing said guide bar, and having an arm which extends into proximity to the other limb of said guide bar where the arm is provided with a resilient member which bears on said latter limb.

According to another feature of the invention there is provided a cursor mounted for substantial rectilinear movement on a guide bar, the cursor being of a substantial U-shape in cross-section and embracing the guide bar at one side thereof, and having an arm projecting into proximity to the other side of the guide bar where the arm is provided with a resilient member which bears on the guide bar at said side and resiliently presses the cursor against the edge of the guide bar at the first-mentioned side thereof.

Figures 1, 3:
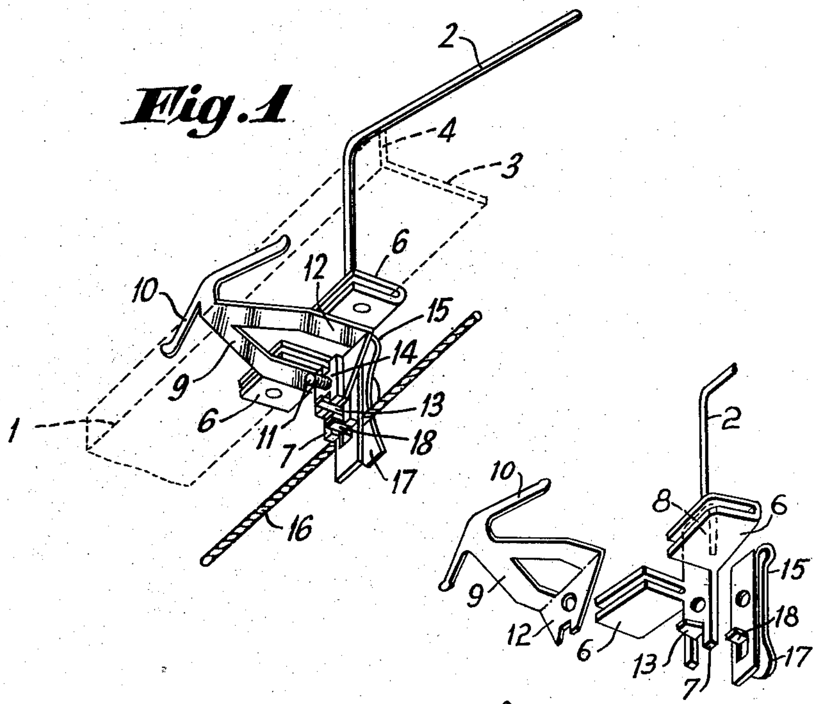
Figure 2:
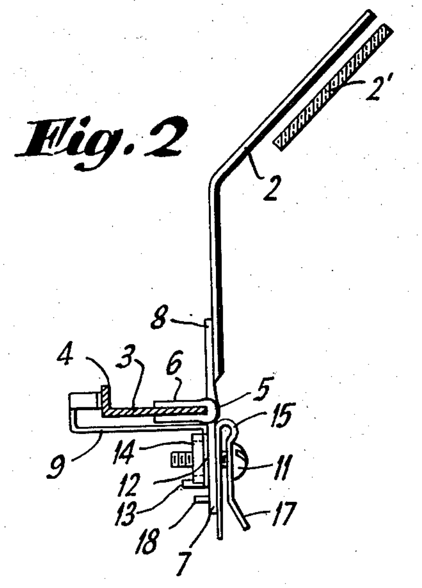

In order that the said invention may be clearly understood and readily carried into effect, the same will now be more fully described with reference to the accompanying drawings, in which:

Fig. 1 is a perspective view on an enlarged scale of an indicating device, in accordance with one example of the invention, the view being taken from underneath the guide bar utilized in the indicating device, the guide bar being indicated by dotted lines and only a fragment being shown for the sake of clearness, and Fig. 2 is an end elevation of the arrangement shown in Fig. 1.

Referring to the drawings, the cursor illustrated is adapted for use in a radio receiver of which the cabinet is provided with an indicator panel mounted at an inclination on the top thereof, and it will be assumed that the cursor is mounted for rectilinear movement relatively to said indicator panel on a guide bar 1 carried by the cabinet of the receiver. The cursor carries a pointer 2 having its upper part inclined as shown, so as to be parallel with said panel, and serving to indicate the station to which the receiver is tuned. The guide bar 1 is L-shaped in cross-section with one limb 3 of the guide bar substantially wider than the other limb 4, the wider limb 3 being arranged substantially parallel with the top of the cabinet and the narrower limb 4 being directed away from the cursor. The cursor 5 comprises a substantially rigid length of material of which the parts 6 are U-shaped in section and embrace the wider limb 3 of the guide bar, while between the parts 6 the material is pressed out to form a lug 7 which projects on one side of said guide bar 1 laterally with respect to the direction of movement of the cursor, and to form a further lug 8 (Fig. 2) disposed on the other side of said guide bar, to which the pointer 2 is secured. An arm 9 is secured to the lug 7 and extends into proximity to the narrower limb 4 of the guide bar 1, the end of said arm being bent over the narrower limb, and the bent end being formed as a longitudinally extending leaf spring 10 which bears with its ends on the outer surface of the narrower limb 4 of the guide bar. The arm 9 is secured to the lug 7 by means of a single screw 11 passing through the lug and through a projecting wing 12 in the arm 9, a tongue 13 which is pressed out from the lug 7 engaging a recess on the wing 12, thereby preventing the arm 9 from pivoting on the screw 11. The nut 14 by which the wing 12 is held on the screw 11 is H-shaped and the tongue 13 is adapted also to engage one or other of the recesses in the nut and lock it against rotation. The screw 11, the head of which is accessible from the rear, can thus be readily adjusted. The cursor 5 is arched slightly, as indicated, so that it is caused by the leaf spring 10 to press lightly only with the opposite ends of the bottom of the channel formed in the parts 6 on the edge of the wider limb 3 of the guide bar. The cursor can therefore be easily moved and the liability of the cursor sticking on the guide bar is effectively reduced, even when the cursor is moved to its limits of travel, but at the same time, since substantial areas of the surfaces of the limb 3 are embraced by the parts 6 the cursor is effectively steadied and pointer wobble is reduced.

The screw 11 also serves to secure in position and to close a U-shaped clamp 15, said clamp being adapted to engage a cord or wire 16 which is driven by the tuning mechanism of the radio receiver and when so engaged the cursor moves rectilinearly on manipulating the tuning mechanism. Even if the pull exerted by the cord or wire 16 is not exactly parallel to the direction of movement of the cursor, as may sometimes be the case, the arrangement described serves to prevent the cursor from rocking or sticking on the bar 1. The clamp comprises a thin resilient metal strip bent to U-shape and having a free end 17 bent away from the other free end of the clamp so that when the chassis of the receiver which carries the cord or wire 16 associated with the tuning mechanism is inserted in the cabinet, the bent end facilitates entry of said cord or wire into said clamp. An out-turned tongue 18 in the clamp 15 engages the recess in the lug 7 which is left when the tongue 13 is pressed out of the lug, thereby preventing rotation of the clamp on the screw 11.

In a modification of the invention the narrower limb 4 of the guide bar 1 is turned towards the arm 9 and in this case the arm is bent sufficiently to clear the limb 4. In another modification the clamp is secured against the front surface of the lug 7 which is to be the front in the drawing, while the arm 9 passes to the rear and is secured against the rear surface of the lug 7, the lug in this case projecting through a hole in the arm 9, or alternatively the arm may project through a hole in the lug.

Although the invention is especially applicable to indicating devices for use in radio receivers, it will be understood that the invention is also applicable to other apparatus. Moreover, the invention is not limited to the above described example in which the cursor is carried by the cabinet of the receiver since it can be employed in cases where the cursor is carried by the chassis of the receiver. Also the cursor may be mounted for vertical movement or movement in any other direction.

What I claim is:

1. An indicating device comprising a cursor having substantially parallel side parts joined along one edge by a bottom part to form a substantial U-shaped in cross-section, a thin elongated guide bar supporting said cursor for substantially rectilinear movement, said cursor embracing the guide bar at one edge thereof with the inner surfaces of the side parts of the cursor in sliding engagement respectively with opposite surfaces of said guide bar, an arm projecting from said cursor into proximity to the other edge of said guide bar, and resilient means on said arm and bearing on said guide bar at said other edge thereof to press the bottom part of said cursor into engagement with the first-mentioned edge of said guide bar.

2. An indicating device according to claim 1, including a length of material folded about longitudinal lines to form said side parts of the cursor, the bottom part of said cursor being longitudinally arched to press only with its ends on said first-mentioned edge of the guide bar.

3. An indicating device according to claim 1, said arm being formed of resilient material, and said resilient means comprising a leaf spring formed integrally with said arm.

4. An indicating device according to claim 1, said cursor being provided with a laterally projecting lug, and said arm being provided with a laterally projecting wing secured against one surface of said lug.

5. An indicating device according to claim 4, comprising a resilient clamping device secured against the other surface of said lug, whereby a cord can be attached to said cursor for impartign said rectilinear movement thereto, and a common attachment means securing said arm and said clamp to said lug.

6. An indicating device comprising a cursor having substantially parallel side parts joined along one edge by a bottom part to form a substantially U-shape in cross-section, a thin elongated member having limbs substantially at right angles to each other to form a guide bar of substantially L-shape in cross-section, said cursor being mounted thereon for substantially rectilinear movement, said cursor embracing one limb of said guide bar with the inner surfaces of the side parts of the cursor in sliding engagement respectively with the opposite surfaces of said limb, an arm projecting from said cursor into proximity to the other limb of said guide bar, and a resilient member on said arm and bearing on that surface of the second-mentioned limb of said guide bar which is turned away from the first-mentioned limb thereof, whereby the bottom of the cursor is pressed into engagement with the free edge of the first-mentioned limb of the guide bar.

7. An indicating device according to claim 6, said cursor comprising a length of material folded about longitudinal lines to form said side parts, the bottom of said cursor being longitudinally arched to press only with its ends on the free edge of the first-mentioned limb of the guide bar.

8. An indicating device according to claim 6, said arm being formed of resilient material, and said resilient member comprising a leaf spring formed integrally with said arm.

9. An indicating device according to claim 6, said cursor being provided with a laterally projecting wing secured against one surface of said lug.

10. An indicating device according to claim 9, comprising a resilient clamping device secured against the other surface of said lug, whereby a cord can be attached to said cursor for imparting said rectilinear movement thereto, and a common attachment means securing said arm and said clamp to said lug.

11. An indicating device for radio apparatus, comprising a cursor formed of a length of material folded about longitudinal lines to form substantially parallel side parts joined along one edge by a bottom part, said bottom part being longitudinally arched, a thin elongated member having limbs substantially at right angles to each other to form a guide bar of substantially L-shape in cross-section, said cursor being mounted thereon for substantially rectilinear movement, said cursor embracing one limb of said guide bar with the inner surfaces of the side parts of the cursor in sliding engagement respectively with the opposite surfaces of said limb, a laterally projecting lug on said cursor, a resilient arm provided with a laterally projecting wing, attachment means securing said wing against one surface of said lug with said arm projecting into proximity to the other limb of said guide bar, a leaf spring integral with said arm and bearing on that surface of the limb of said guide bar turned away from the first-mentioned limb, whereby the ends of the bottom of said cursor are pressed into engagement with the free edge of said first-mentioned limb of said guide bar, and cord-clamping means secured against the other surface of said lug by said attachment means.

FRANK WILKINSON.

REFERENCES CITED

The following references are of record in the file of this patent:

UNITED STATES PATENTS

| Number | Name | Date |
|---|---|---|
| 1,885,621 | Newill | Nov. 1, 1932 |
| 2,120,136 | Lyman | June 7, 1938 |
| 2,137,684 | Gillard | Nov. 22, 1938 |